(12) United States Patent
Grimes

(10) Patent No.: US 6,449,345 B1
(45) Date of Patent: Sep. 10, 2002

(54) SELECTIVE REMOTE ACCESS OF AN AUDIO MESSAGING SYSTEM

(75) Inventor: Gary J. Grimes, Birmingham, AL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/301,473

(22) Filed: Apr. 28, 1999

(51) Int. Cl.⁷ .............................................. H04M 1/652
(52) U.S. Cl. ................... 379/88.23; 379/88.24
(58) Field of Search ......................... 379/88.12, 88.19, 379/88.2, 88.21, 88.22, 88.23, 88.24, 142.01, 142.06

(56) References Cited

U.S. PATENT DOCUMENTS 5,797,124 A  *  8/1998  Walsh et al. ................. 704/275
6,249,765 B1 *  6/2001  Alder et al. ................. 704/500
6,327,343 B1 * 12/2001  Epstein et al. ........... 379/88.01

* cited by examiner

*Primary Examiner*—Scott L. Weaver
(74) *Attorney, Agent, or Firm*—John C. Moran

(57) ABSTRACT

Allowing a selective retrieval of messages based on message characteristics. The message characteristics are originating telephone number, specific caller, originating area code, originating country code, calls within a time period, and calls not resulting in a message. In addition, messages can be searched for a range of telephone numbers, range of area codes, range of country codes.

7 Claims, 6 Drawing Sheets

SELECTIVE REMOTE ACCESS OF AN AUDIO MESSAGING SYSTEM

TECHNICAL FIELD

The present invention relates to telecommunication systems, and, in particular, to remote access of audio messaging systems.

BACKGROUND OF THE INVENTION

Audio messaging systems, such as voice mail systems and answering machines, allow remote retrieval of messages. However, these audio messaging systems do not allow the selective accessing of messages stored on the system. For example, it is not possible to access only those messages that came from a particular area code, a particular individual, a particular country, or a particular telephone number or set of telephone numbers. In addition, if a caller fails to leave a message, it is not possible to retrieve the caller identification information from the audio messaging system since the audio messaging system will not retain this information unless a message is recorded. Nor, do prior art audio messaging systems allow a user to access only messages recorded during a particular range of time. Often, a user of an audio messaging system needs to be able to utilize one of the above-mentioned features.

SUMMARY OF THE INVENTION

The foregoing problems are solved and a technical advance is achieved by an audio messaging system and method that allow the selective retrieval of messages based on message characteristics. Advantageously, the message characteristics are originating telephone number, specific caller, originating area code, originating country code, calls within a specified time period, and calls not resulting in an audio message. In addition, messages can be searched for a range of telephone numbers, range of area codes, or range of country codes.

Other and further aspects of the present invention will become apparent during the course of the following description and by reference to the accompanying drawing.

DETAILED DESCRIPTION

Figure 1:
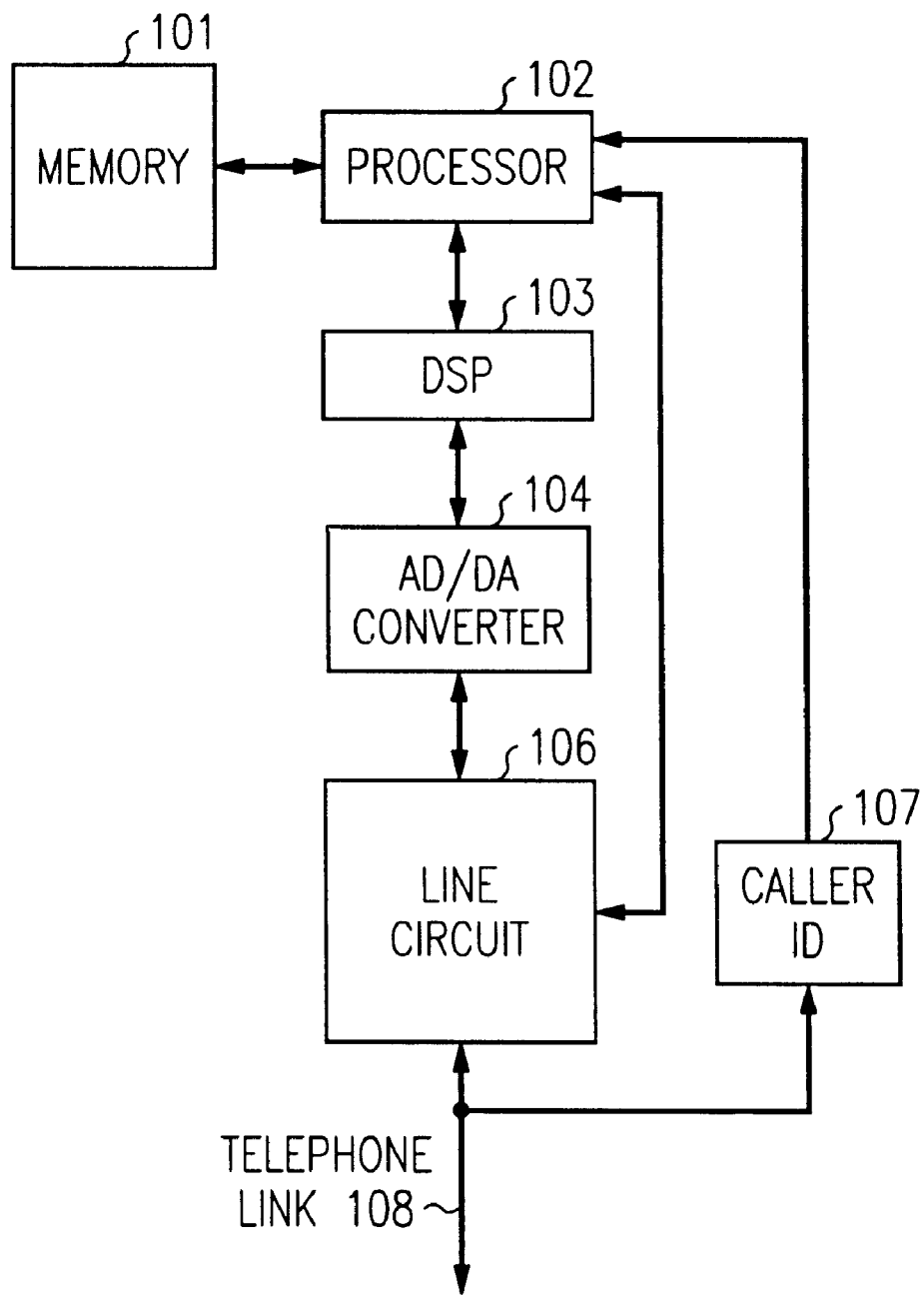
FIG. 1 illustrates, in block diagram form, an answering machine in accordance with the invention.

FIG. 1 illustrates an answering machine for implementing the invention. Processor 102 performs all control functions. When an incoming call is received via telephone link 108, this fact is detected by line circuit 106 which signals processor 102. In addition, caller ID circuit 107 receives the caller identification information and transfers this information to processor 102. Processor 102 is responsive to the incoming call to signal line circuit 106 to answer the call. Processor 102 then transmits text for a message requesting that the caller leave a message after the tone to digital signal processor (DSP) 103 which converts this text into information that can be converted from digital to analog by analog-to-digital/digital-to-analog (AD/DA) converter 104. AD/DA converter 104 transmits the analog information via line circuit 106 to telephone link 108. Processor 102 then proceeds to guide the caller through the process of leaving a message utilizing units 103–106. When the caller leaves a message, DSP 103 encodes the digital representation of this audio message received by AD/DA converter 104 into a compact file format. Processor 102 is responsive to the audio message from the caller to insert into memory 101 the compact file, time of day, and caller ID information received from caller ID circuit 107. One skilled in the art could readily envision that if the name of caller was not part of the caller ID information, processor 102 could utilize a reverse telephone directory to obtain the caller's name from the calling telephone number. Such directories are commercially available. Processor 102 in conjunction with the other units of FIG. 1 then allows remote access to the messages stored in memory 101. The steps to allow remote access are set forth in FIGS. 2–5.

Figure 2:
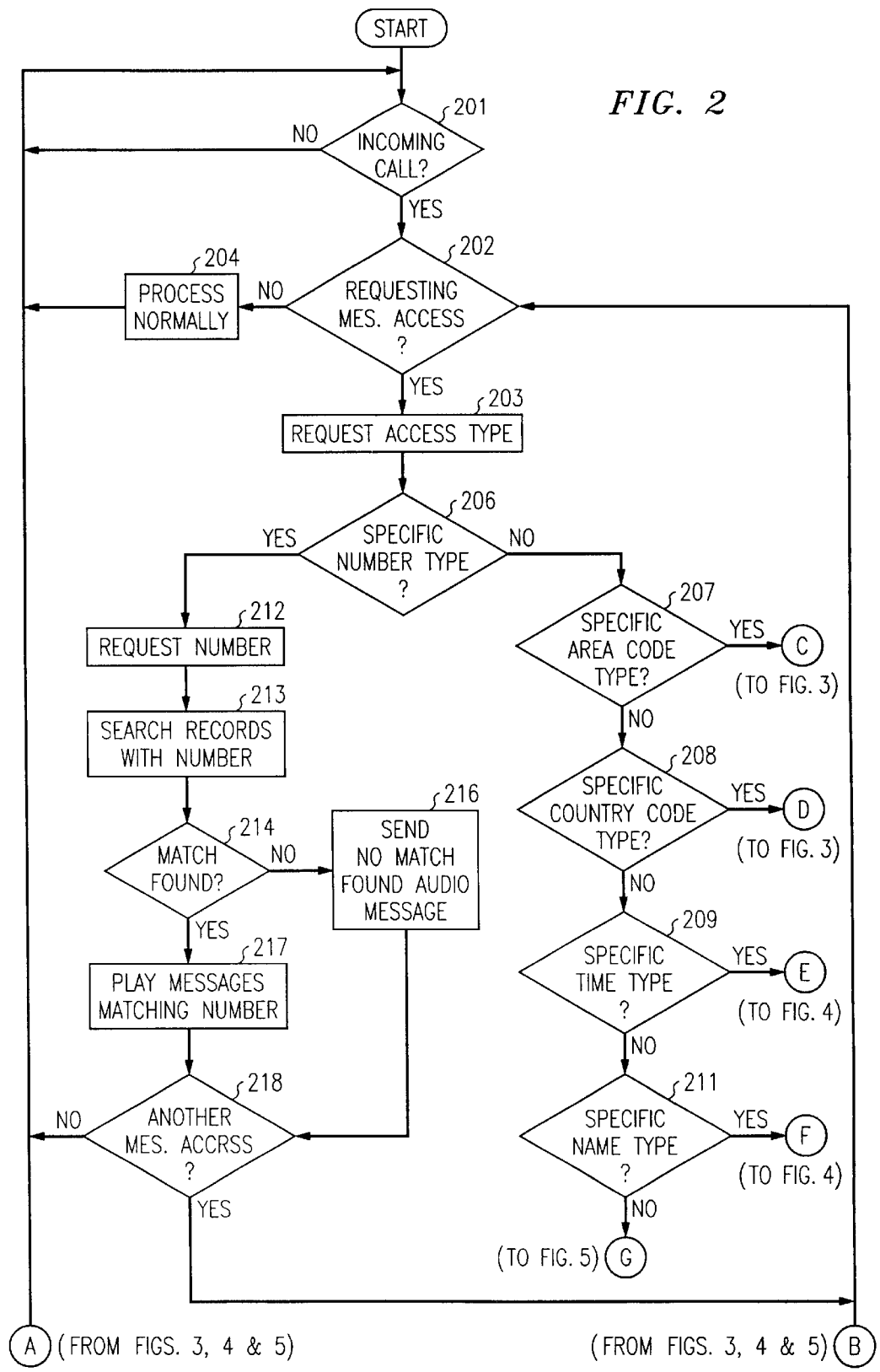
FIGS. 2–5 illustrate, in flow chart form, steps for implementing the invention.
Figure 3:
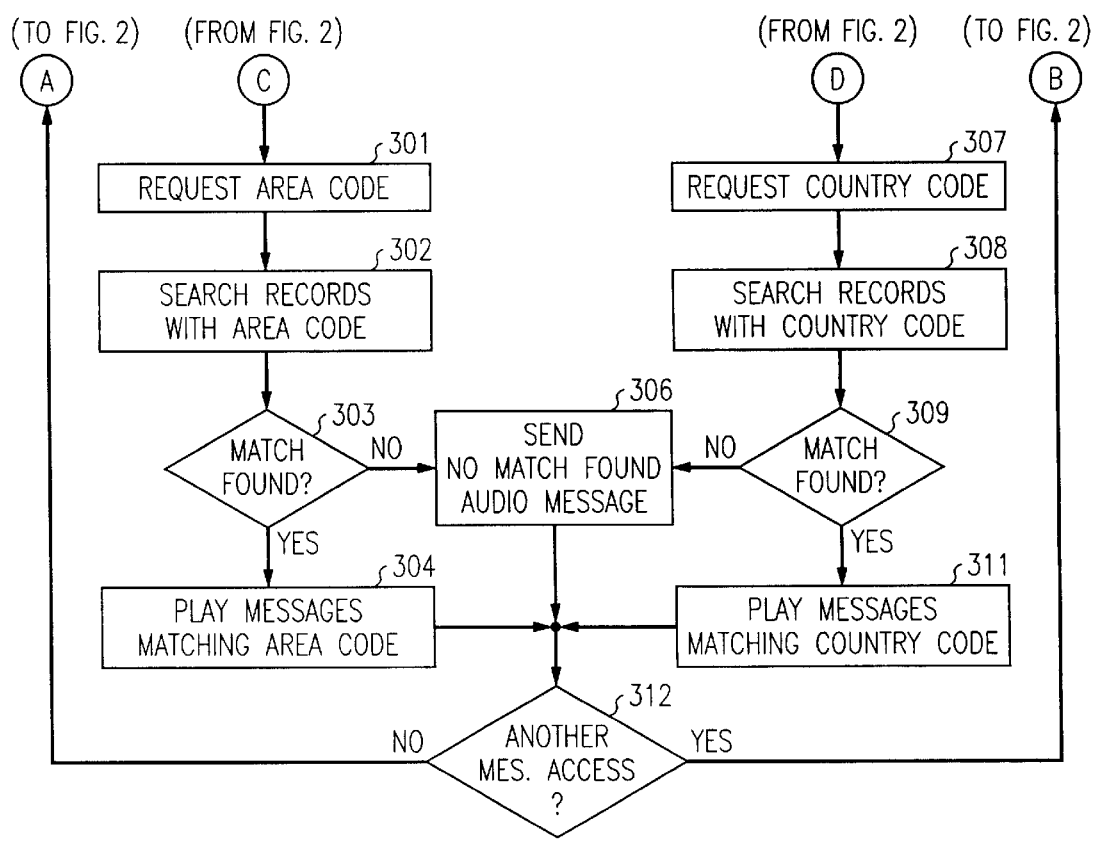
Figure 4:
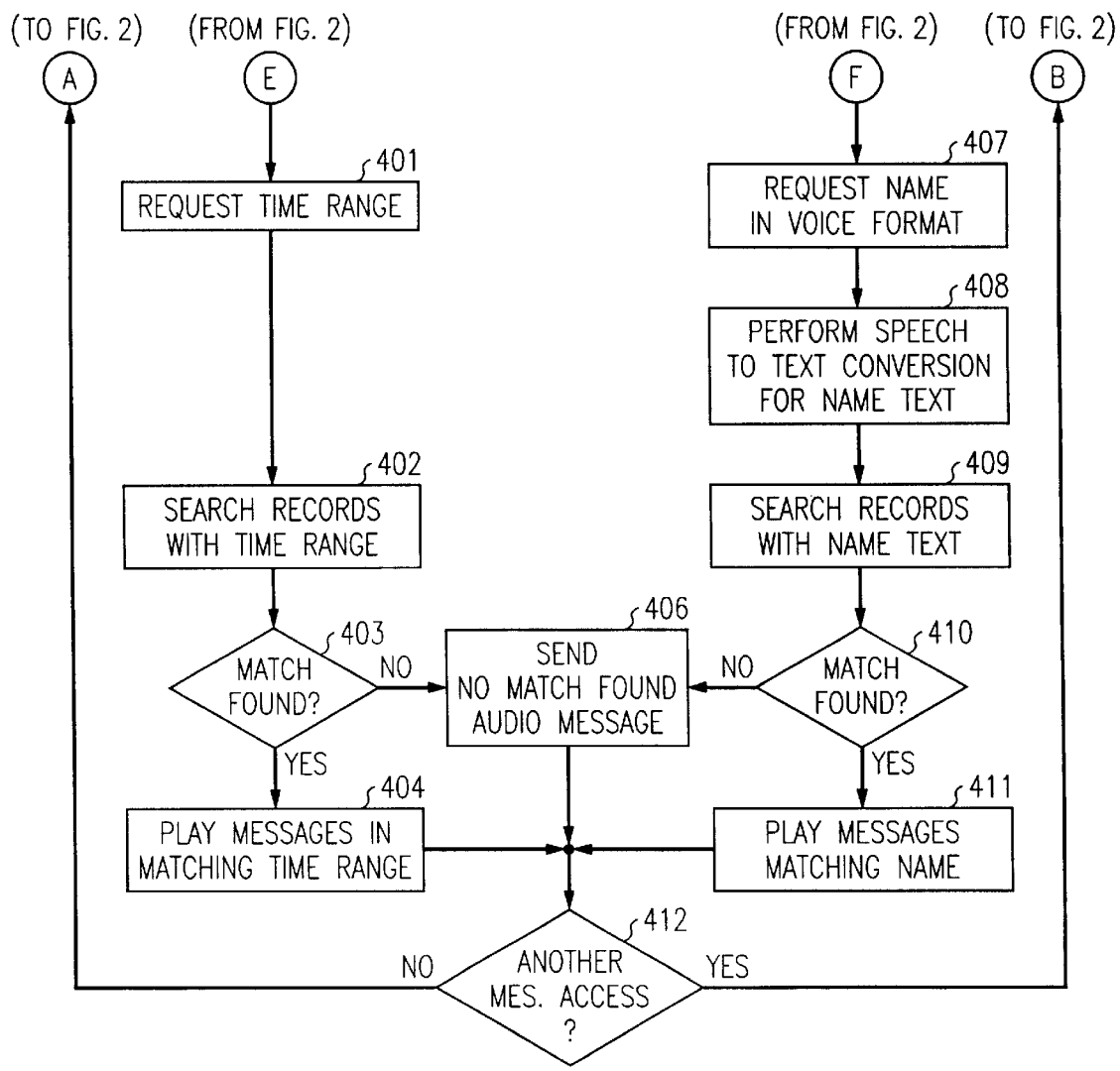

Referring first to FIG. 2, decision block 201 determines when an incoming call is received. Upon reception of an incoming call, control is transferred to decision block 202 that determines if the incoming call is a call from the owner of the answering machine wishing to perform remote access or is a call from another individual who wishes to leave a message. If the call is from another individual, control is transferred to block 204 which performs normal processing on the call with the exception that block 204 will record the name and telephone number of the caller as a record even if the caller does not leave a voice message. If the answer in decision block 202 is yes, a request is transmitted to the caller to indicate the type of access that they wish to perform. This type of access is indicated by the actuation of a key on the keypad of the calling telephone. Decision block 206 then determines if the access type is that for a specific telephone number. If the answer is yes, control is transferred to block 212 which requests that the caller enter the telephone number to be searched for. If the caller wishes to access all messages, the caller simply actuates the "*" key on the telephone keypad. This will result in the records being searched for all telephone numbers. If the user wants to access all calls from office prefix "436", the caller would actuate on the telephone keypad the keystrokes of "436****". The "*" when entered into a sequence of keystrokes indicates that any number can be utilized at that position. After the number entry has been received in block 212, block 213 searches all the records stored in memory 101 for a match. Decision block 214 determines if a match or matches are found. If no match is found, block 216 sends an audio message stating that no match was found before transferring control to decision block 218. Decision block 218 allows the caller to determine if they wish to perform another message access. If the answer is yes in decision block 218, control is transferred to decision block 202. If the answer is no in decision block 218, control is transferred back to decision block 201.

Returning to decision block 214, if the answer is yes in decision block 214 indicating that a match or matches was found, control is transferred to block 217 that plays all messages in all records that matched the entered number. Block 217 also allows the caller to perform the operations to delete, skip, etc. with respect to the records, using well-known techniques.

Returning to decision block 206, if the access type is not that for a specific number, control is transferred to decision block 207 to determine if the type is that for a specific area code. If the answer is yes, control is transferred to block 301 of FIG. 3. Block 301 requests the area code for which a search is to be performed. Note, that if the user wants to access all long distance calls, the user transmits the key actuations for "***". Once the area code has been received, control is transferred to block 302 which searches all records looking for calls that were received from the entered area code or codes before transferring control to decision block 303. Decision block 303 determines if a match was found, if the answer is no, control is transferred to block 306. Blocks 306 and 312 perform the same operations as performed by blocks 216 and 218 of FIG. 2. If the answer in decision block 303 is yes, block 304 plays the messages that were received from the area code that was inputted before transferring control to decision block 312.

Returning to decision block 207, if the access is not for a specific code type, control is transferred to decision block 208 that determines if the access is for a specific country code type. If the answer is yes in decision block 208, control is transferred to block 307 of FIG. 3. The latter block requests the country code be entered. Once again, the "*" may be utilized to substitute for any number in the country code. If all "*'s" are entered, the records will be searched for all international calls. Block 308 performs the search of the records looking for the entered country code. Decision block 309 determines if any match was found. If no match was found control is transferred to block 306 whose operations were previously described. If a match was found, decision block 309 transfers control to block 311 which plays the messages for the records matching the entered country code before transferring control to decision block 312 whose operations were previously described.

Returning to decision block 208, if the answer is no, control is transferred to decision block 209 which determines if the access type is for a specific time period. If the answer is yes in decision block 209, control is transferred to block 401 of FIG. 4. Block 401 requests a time range from the caller. First, block 401 requests a starting time that is entered as four digits utilizing the 24-hour clock, and then, block 401 requests the end time. Block 402 then searches the records looking for messages that were received within the entered time range. Block 403 determines if a match was found. If the answer is no in decision block 403, control is transferred to block 406. The operations of blocks 406 and 412 are identical to those described for blocks 216 and 218 of FIG. 2. If the answer is yes in decision block 403, block 404 plays the messages that were received in the time range before transferring control to decision block 412.

Returning to decision block 209, if the answer is no, decision block 211 determines if a specific name access is being made. If the answer is yes, control is transferred to block 407 of FIG. 4. Block 407 requests that the caller state the name with which the caller wishes to search the records. Block 408 then converts the voice message utilizing speech to text conversion into the text of the name. In FIG. 1, this speech to text conversion is performed by DSP 103. After the name text has been determined, block 409 searches the records for the name in the records. Block 410 then determines if a match has been achieved. If the answer is no, control is transferred to block 406. If the answer is yes, block 411 plays all the messages whose records contain the name before transferring control to decision block 412.

Figure 5:
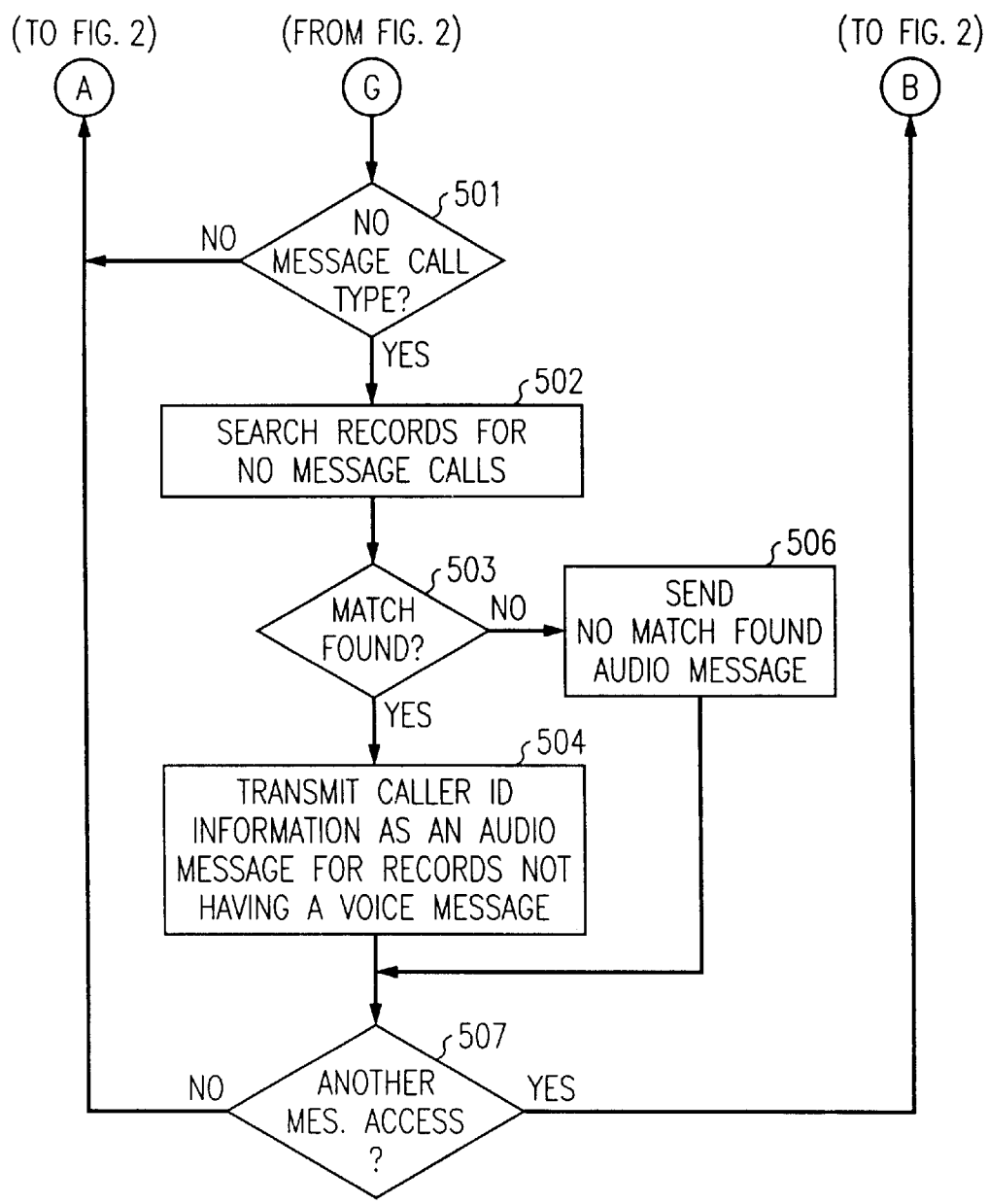

Returning to decision block 211 of FIG. 2, if the answer is no, control is transferred to decision block 501 of FIG. 5. Decision block 501 determines if the access type is for records that contain no voice message from the caller. In other words, the caller failed to leave a message but the answering machine recorded the caller ID information in a record. If the answer is no in decision block 501, control is transferred to decision block 201 of FIG. 2. If the answer is yes in decision block 501, block 502 searches the records for records that contain no voice message. Decision block 503 then determines if a match was found. If the answer is no, control is transferred to block 506. The operations of blocks 506 and 507 are identical to the operations of blocks 216 and 218 of FIG. 2. If the answer in decision block 503 is yes, block 504 transmits the caller ID information as an audio message for all records not having a voice message associated with them. The caller ID information is stored as text in memory 401, and a text to speech conversion must be performed by DSP 103 to implement block 504. After execution of block 504, control is transferred to decision block 507.

Figure 6:
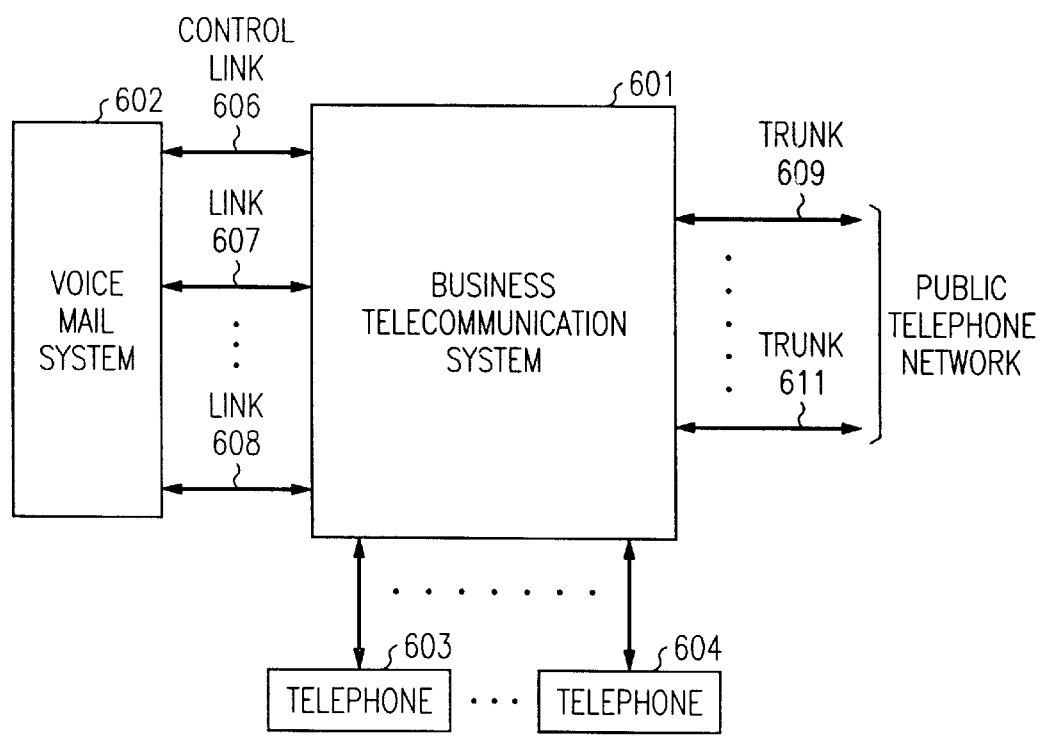
FIG. 6 illustrates, in block diagram form, a voice messaging system for implementing the invention.

FIG. 6 illustrates voice mail system 602 for implementing the invention. Voice mail system 602 provides voice mail support for telephone 603–604 connected to business communication system 601. For example, when a call is received for telephone 603 by business communication system 601 from telephone 604 or from a telephone connected to the public telephone network and received via trunk 609, business telecommunication system 601 rings telephone 603 for a predetermined number of rings. If the call is not answered, business telecommunication system 601 then transfers the call to voice mail system 602 by connecting the call via one of the links 607–608 to voice mail system 602. In addition, business telecommunication system 601 transmits the destination telephone number and caller identification information received via trunk 609 or known internally to business telecommunication 601 if the calling telephone is telephone 604 to voice mail system 602. Voice mail system 602 then records a message as was previously described for the answering machine illustrated in FIG. 1. When the user of telephone 603 accesses voice mail system 602 to obtain the user's voice mail messages, voice mail system 602 implements the steps illustrated in FIGS. 2–5. Voice mail system 602 has an internal DSP as is well-known in the art.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for selectively accessing records stored in a voice messaging system, comprising the steps of:
   receiving an incoming call;
   determining that the incoming call is to access records stored in the voice messaging system;
   requesting a telephone number of a telephone originating the incoming call for use in accessing the records from an originator of the incoming call wherein the telephone number comprises a plurality of a character that represents any digit whereby a single number including the plurality of the characters represents a plurality of telephone numbers.

2. A method for selectively accessing records stored in a voice messaging system, comprising the steps of:
   receiving an incoming call;
   determining that the incoming call is to access records stored in the voice messaging system;
   requesting an area code of a telephone originating the incoming call;
   searching the records for the area code; and
   transmitting in voice medium the records found to have the area code.

3. The method of claim 2 wherein the area code comprises a plurality of a character that represents any digit whereby a single area code including the plurality of the character represents a plurality of area codes.

4. An apparatus for performing the method of claim 2.

5. A method for selectively accessing records stored in a voice messaging system, comprising the steps of:

receiving an incoming call;

determining that the incoming call is to access records stored in the voice messaging system;

requesting a country code of a telephone originating the incoming call;

searching the records for the country code; and transmitting in voice medium the records found to have the country code.

6. The method of claim 5 wherein the country code comprises a plurality of a character that represents any digit whereby a single country code including the plurality of the character represents a plurality of country codes.

7. An apparatus for performing the method of claim 5.

* * * * *